US009344883B2

(12) United States Patent
Perry et al.

(10) Patent No.: US 9,344,883 B2
(45) Date of Patent: May 17, 2016

(54) SYSTEM AND METHOD FOR WIDE AREA WIRELESS CONNECTIVITY TO THE INTERNET

(75) Inventors: Paul Perry, Lexington, MA (US); Sean Byrnes, Cambridge, MA (US); Valeriy Elbert, Arlington, MA (US); Chivas Nambiar, Brookline, MA (US); Conor Hunt, Newton, MA (US); Thanos Kosmidis, Brookline, MA (US); Vineet Gupta, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/072,306

(22) Filed: Mar. 25, 2011

(65) Prior Publication Data

US 2011/0173682 A1   Jul. 14, 2011

Related U.S. Application Data

(62) Division of application No. 10/845,281, filed on May 13, 2004.

(60) Provisional application No. 60/494,662, filed on Aug. 13, 2003.

(51) Int. Cl.
*H04L 29/06* (2006.01)
*H04W 12/06* (2009.01)

(52) U.S. Cl.
CPC .................................... *H04W 12/06* (2013.01)

(58) Field of Classification Search
None
See application file for complete search history.

(56) References Cited

U.S. PATENT DOCUMENTS

| 5,774,551 | A | * | 6/1998 | Wu et al. ........................ 713/155 |
| 5,969,678 | A | * | 10/1999 | Stewart ......................... 342/457 |
| 6,014,673 | A | * | 1/2000 | Davis .................. G06F 11/1471 |
| 6,616,035 | B2 | * | 9/2003 | Ehrensvard et al. .......... 235/380 |
| 6,760,759 | B1 | * | 7/2004 | Chan ............................. 709/219 |
| 6,845,097 | B2 | * | 1/2005 | Haller et al. .................. 370/352 |
| 7,062,491 | B2 | * | 6/2006 | McNulty et al. |
| 7,149,896 | B1 | | 12/2006 | Bahl et al. |
| 7,185,360 | B1 | * | 2/2007 | Anton et al. ....................... 726/3 |
| 7,712,128 | B2 | | 5/2010 | Porozni et al. |
| 2002/0001307 | A1 | * | 1/2002 | Nguyen et al. ................ 370/386 |
| 2002/0169883 | A1 | | 11/2002 | Bright et al. |
| 2002/0191575 | A1 | | 12/2002 | Kalavade et al. |
| 2002/0194473 | A1 | * | 12/2002 | Pope et al. .................... 713/168 |
| 2003/0058818 | A1 | | 3/2003 | Wilkes et al. |
| 2003/0061363 | A1 | * | 3/2003 | Bahl ....................... H04L 63/08 709/229 |
| 2003/0169713 | A1 | | 9/2003 | Luo |
| 2004/0193712 | A1 | | 9/2004 | Benenati et al. |
| 2004/0224664 | A1 | * | 11/2004 | Guo ............................. 455/411 |
| 2005/0026596 | A1 | * | 2/2005 | Markovitz ................... 455/411 |
| 2005/0096048 | A1 | * | 5/2005 | Clare et al. .................... 455/433 |
| 2012/0030737 | A1 | * | 2/2012 | Pagan .................... G06F 21/44 726/5 |

* cited by examiner

*Primary Examiner* — Benjamin Lanier

(57) ABSTRACT

A system and method for managing access to a Wi-Fi system include redirecting an access request, comprising a user credential, from a wireless user device to an authentication server, obtaining, from a first database, a list of a plurality of authentication databases from which users may be authenticated, the list including a protocol required for communication with each of the authentication databases, transmitting a request to each of the listed authentication databases using the identified protocol, and permitting the user access to the Internet through the Wi-Fi system if the user is authenticated by at least one of the listed authentication databases.

19 Claims, 11 Drawing Sheets

FIG. 10

| | | | | 10-9-2003 LOGOUT |
|---|---|---|---|---|
| HOTSPOT ADMINISTRATION - ALL HOTSPOTS | | | | |
| THIS TABLE SHOWS ALL HOTSPOTS CURRENTLY UNDER REPAIR... | | | | |
| HOTSPOTS | | | | |
| CROSS STREET ADDRESS | | IP | | STATUS |
| 1 AVE & 68 ST SWC | 383 | 132.197.128.2 | 08/18/03 16:28 | UNABLE TO PING | [UPDATE] |
| 1 AVENUE & E 71 ST NEC | 458 | 132.197.128.22 | 08/18/03 16:29 | FAILED OPS/CAN'T SURF | [UPDATE] |
| 106 ST & 2 AVE | 1529 | 132.197.128.13 | 08/18/03 14:30 | UNABLE TO PING | [UPDATE] |
| 12 ST ON 8 AVE | 258 | 132.197.128.167 | 08/18/03 14:31 | POWER PENDING | [UPDATE] |
| 125TH ST & 7TH (VERIZON STORE) | 1809 | 132.197.128.54 | 08/18/03 14:27 | ACTIVE | [UPDATE] |
| 125TH ST & 7TH (VERIZON STORE) | 1811 | 132.197.128.60 | 08/18/03 14:27 | UNABLE TO PING | [UPDATE] |
| 125TH ST & 7TH (VERIZON STORE) | 1808 | 132.197.128.3 | 08/18/03 14:27 | ACTIVE | [UPDATE] |
| 125TH ST & 7TH (VERIZON STORE) | 1807 | 132.197.128.4 | 08/17/03 16:31 | UNABLE TO PING | [UPDATE] |
| 125TH ST & 7TH (VERIZON STORE) | 1806 | 132.197.128.43 | 08/17/03 16:31 | WRONG TN | [UPDATE] |
| 125TH ST & 7TH (VERIZON STORE) | 1804 | 132.197.128.65 | 08/17/03 16:30 | UNABLE TO PING | [UPDATE] |
| 1300 6TH AVENUE | 1093 | 132.197.128.12 | 08/17/03 16:30 | FAILED OPS/CAN'T SURF | [UPDATE] |
| 14 ST & 8 AVE | 259 | 132.197.128.43 | 08/17/03 16:30 | POWER PENDING | [UPDATE] |
| 14 ST & HIKISON | 1537 | 132.197.128.64 | 08/17/03 14:20 | UNABLE TO PING | [UPDATE] |
| 158 AV & CROSS BAY BLVD | 1744 | 132.197.128.14 | 08/17/03 14:20 | FAILED OPS/CAN'T ASSOCIATE | [UPDATE] |
| 17 ST & BROADWAY | 94 | 132.197.128.16 | 08/17/03 14:20 | TO BE TESTED | [UPDATE] |
| 19TH ST ON 5 AVE | 359 | 132.197.128.74 | 08/17/03 14:18 | ACTIVE | [UPDATE] |
| 2-242 HOTSPOT | 0 | 132.197.128.243 | 08/17/03 14:18 | POWER PENDING | [UPDATE] |
| 20TH ST ON 5 AVE | 360 | 132.197.128.32 | 08/17/03 14:18 | WRONG TN | [UPDATE] |
| 22ND AND 4TH | 0 | 132.197.128.67 | 08/17/03 14:18 | FAILED OPS/CAN'T ASSOCIATE | [UPDATE] |
| 22ND AND 6TH | 0 | 132.197.128.32 | 08/15/03 14:30 | ACTIVE | [UPDATE] |

PREV [0] 1 2 3 4 5 6 7 8 9 10 11 12 13 NEXT

Side navigation:
- MAIN
- MANAGE CUSTOMERS
- MANAGE HOTSPOTS
- TROUBLESHOOT
  - -ALL
  - -SEARCH
  - -CREATE NEW
  - -DISPATCH
  - -EDIT STATUS LIST
  - -ADD NEW STATUS
- MANAGE
- MANAGE USERS
- CHANGE PASSWORD
- LOGOUT

1000

SYSTEM AND METHOD FOR WIDE AREA WIRELESS CONNECTIVITY TO THE INTERNET

RELATED APPLICATIONS

This application is a divisional of U.S. patent application Ser. No. 10/845,281, filed May 13, 2004, which claims priority to under 35 U.S.C. §119(e) based on Provisional Patent Application No. 60/494,662, filed Aug. 13, 2003, both of which are herein incorporated by reference.

FIELD

The present invention relates to systems and methods for providing wireless Internet connectivity across a wide area such as a city. More particularly, the invention relates to systems and methods for provisioning and management of the hardware used to provide the wide area WiFi service and the users of that service.

BACKGROUND

Downward hardware pricing trends and maturing standards have positioned Wireless Local Area Network (WLAN) technology for widespread adoption. WLAN access points are finding their way into homes as a way of sharing one broadband DSL or Cable Modem connection without cabling hassles. Both Enterprise(s) and Small Business(es) are moving towards wireless technologies for cost reduction over that of a wired infrastructure and to accommodate a mobile workforce. WLAN technologies are also beginning to explore the "En Route" market potential served through strategic deployment of public WLAN access points for Internet access, better known as Hotspots, which are being built to provide public Internet access using the IEEE 802.11 standards.

The broadband wireless Web is being built around a technology known as Wi-Fi, or IEEE 802.11 family of protocols. Wi-Fi stands for Wireless Fidelity, an (LANs) at speeds up to 54 megabits per second. The original 802.11 standard established in June 1997 defined a 2.4 GHz system with a maximum data rate of 2 Mbps. Today there are three fundamental "flavors" of IEEE 802.11 WLAN standards: 802.11a, 802.11b and 802.11g. As of August 2003, 802.11b is the most widely deployed solution due to its wide coverage area and low price, although it suffers from low maximum link rate of 11 Mbps. It also occupies the 2.4 GHz band used by other technologies. 802.11g is an extension to 802.11b, provisioning a maximum link rate of 54 Mbps on 2.4 GHZ spectrum. 802.11a holds the advantage of using 5 GHz frequency band and providing a high maximum link rate up to 54 Mbps.

Current mechanisms to provide Wi-Fi service have tended to restrict themselves to small enterprises, airports, coffee shops and other small scale businesses. Previous solutions can be grouped into two categories: hardware vendors who bundle software management applications with their products and Hotspot vendors who support a narrow number of network architectures. However, such solutions have been unable to provide wide area Wi-Fi solutions due largely to the inability of such solutions to easily integrate multiple or diverse architectures, hardware types, or protocols. In addition, the inability of current solutions to authenticate users from more than one source has hindered efforts at wide-area Wi-Fi services. For example, while many companies may provide cellular, roaming, and/or DSL services in addition to Wi-Fi services, a user of one service cannot easily be added to the Wi-Fi service by cross authentication with the users of these other systems.

SUMMARY

Consistent with the invention, a system and method for managing access to a Wi-Fi system, including redirecting an access request comprising a user credential, from a wireless user device to an authentication server. The system and method further obtain from a first database, a list of a plurality of authentication databases from which users may be authenticated, including a protocol required for communication with each of the authentication databases, and transmits a request to each of the listed authentication databases using the identified protocol. The system and method also permit the user access to the Internet through the Wi-Fi system if the user is authenticated by at least one of the listed authentication databases.

BRIEF DESCRIPTION OF THE DRAWINGS

The accompanying drawings, which are incorporated in and constitute a part of this specification, illustrate several embodiments and together with the description, serve to explain the principles of the present invention.

FIG. 10 is an exemplary screenshot of the administrator portal showing hardware status information.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts. It is to be understood that both the foregoing general description and the following detailed description are exemplary and explanatory only and are not restrictive of the invention, as claimed.

As one of ordinary skill in the art will recognize, the "Internet" as used herein is not limited merely to connection to one or more servers for the purpose of downloading a viewing a website, but may encompass any data exchange that may be accomplished across a computer network, including email, file sharing, and Virtual Private Networks (VPN).

Figure 1:
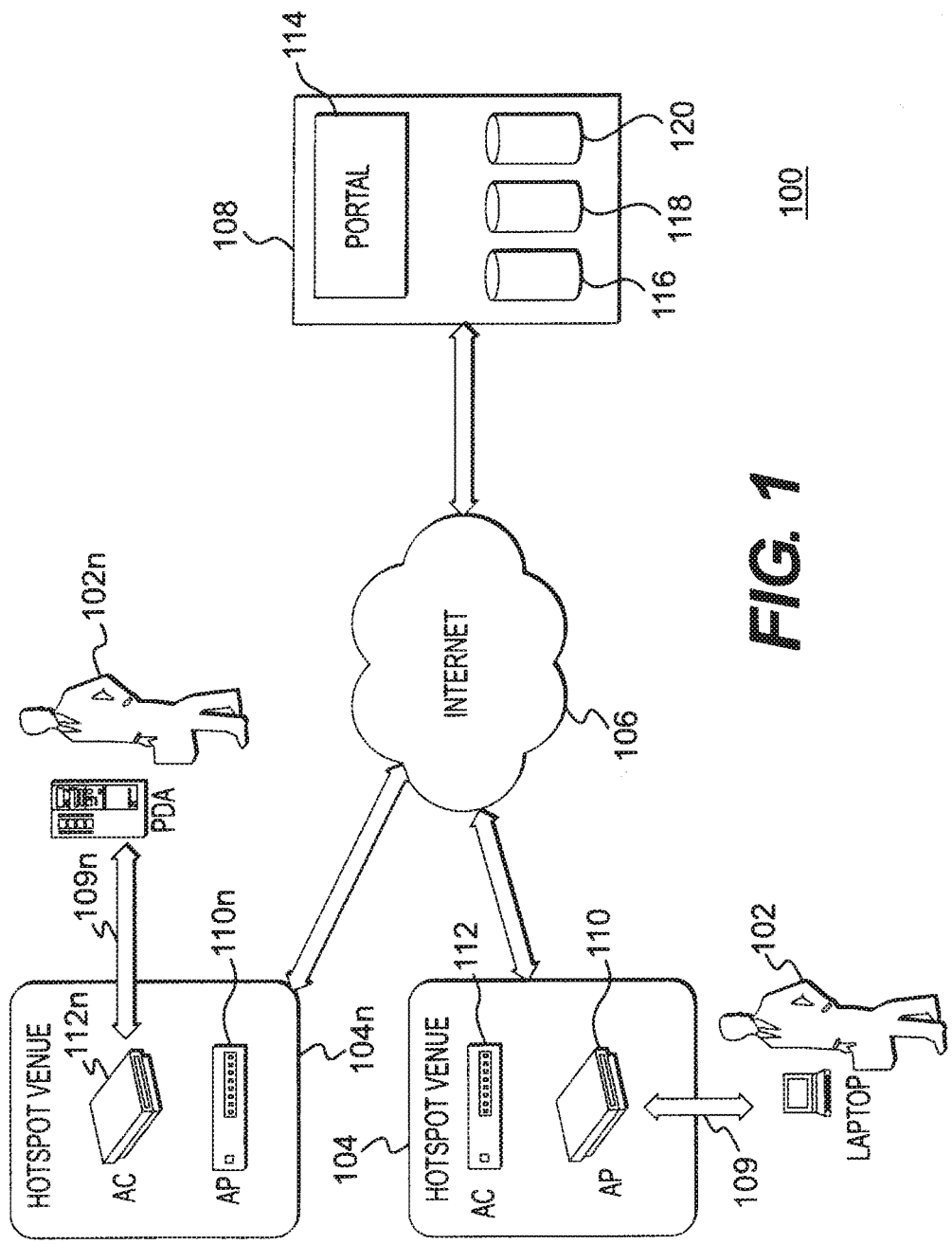
FIG. 1 is a diagram of an exemplary environment in which the present invention may be implemented.

FIG. 1 is a diagram of an exemplary system 100 in which the present invention may be implemented. Exemplary system 100 comprises a customer (or user) 102, a Wi-Fi hotspot venue 104, the Internet 106, and a Wi-Fi administrative server 108. As shown in FIG. 1, there may be more than one customers (102 . . . 102n), and more than one hotspot venues (104 . . . 104n). For simplicity, FIG. 1 shows only two hotspot venues (104 and 104n) each connected to a single customer (102 and 102n, respectively). However, one of ordinary skill in the art will recognize that any number of hotspot venues and customers may be present, consistent with the present invention, and each hotspot venue may connect one or more users to Internet 106.

Each customer may utilize a Wi-Fi enabled Laptop (such as with customer 102), a PDA (such as with customer 102n) or any other electronic device supporting wireless data services (not shown) to make a connection request 109, 109n to the nearest or best reachable hotspot venue 104 to gain wireless access to Internet 106.

Each hotspot venue 104 may comprise at least an access point (AP) 110 and an access controller (AC) 112, which function as described below to authorize customer access to Internet 106 via the hotspot venue.

As shown in FIG. 1, Wi-Fi administrative server 108 comprises a computer running a portal 114. Generally, portal 114 manages users, user authentication, and system hardware as described further below. To perform these functions, portal 114 may utilize one or more databases such as an accounting database 116, a system database 118, and an authentication database (or authentication data storage) 120. One of ordinary skill in the art will recognize that these databases may be implemented as a single database or multiple databases and one or more of the databases may reside on administrative server 108 or on any other computer (not shown) connected to server 108 via an internal network (not shown) or via Internet 106. Furthermore, these database(s) may utilize any pre-existing database platform, such as Radius or ASPP (ASDL Service Provisioning Platform), and may be designed in accordance with any now known or later developed database principles such as object oriented database design.

In operation, accounting database 116 keeps track of user usage information. For example, as described further below, accounting database 116 may utilize one or more records to keep track of each user logged into the system, the access point or hotspot to which they are connected, the duration of the login, and the bytes exchanged during the present connection. System database 118 may keep records of each access point, access controller, authentication database accessible by the system, router or hardwired connection, and for each of these components, the platform implemented on it, and a listing of any protocols necessary for the communication with it. Authentication database 120 may comprise one or more databases maintaining a list of users and administrators with user name and login information for each, as well as the privileges each is permitted once properly logged on. In one embodiment, there will be multiple such authentication databases, for example, to allow the users of various services such as long distance users, DSL users, wireless or cell phone users, as well as the users of third party services (for example roaming services) to access Internet 106 via system 100.

Figure 2:
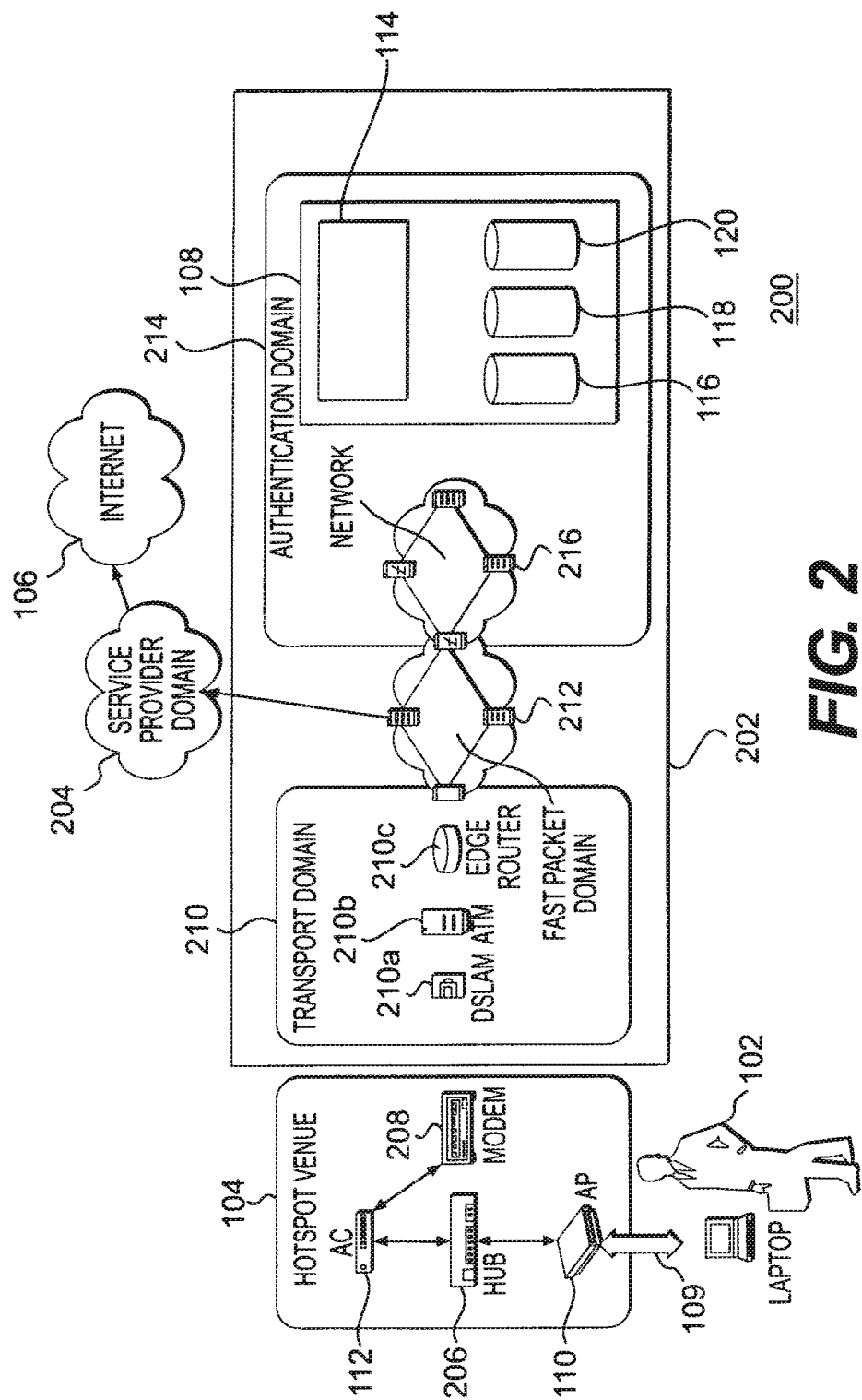
FIG. 2 is a diagram of a second exemplary environment in which the present invention may be implemented.

FIG. 2 is a diagram of a second exemplary system 200 in which the present invention may be implemented. Exemplary system 200 comprises customer 102, a Wi-Fi hotspot venue 104, a backend internet connectivity infrastructure 202, a service provider domain 204, and Internet 106. As with system 100, in system 200 customer 102 may comprise one or more users utilizing a Wi-Fi enabled Laptop, a PDA (not shown) or any other electronic device supporting wireless data services (not shown) to make a connection request to the nearest or best reachable hotspot venue 104 to gain wireless access to Internet 106. For simplicity, FIG. 2 shows only a single customer 102 and a single hotspot venue 104, however, as with system 100, system 200 may comprise any number of customers and hotspot venues.

In FIG. 2, hotspot venue 104 comprises Access Point (AP) 110, and may further include a hub/switch 206, Access Controller (AC) 112, and/or Modem 208. In one embodiment, hotspot venue 104 may comprise the Proxim AP 2500 access point, which includes firmware written by Nomadix, Inc. This firmware allows AP 110 to also act as AC 112, by maintaining a table (not shown) of authorized MAC addresses. A MAC address is a unique identifier for the hardware (such as a network card in the customer laptop or PDA) used by customer 102 to connect to hotspot venue 104. Until customer 102 is granted authorized access to Internet 106 via AC 112, the MAC address of customer 102 is not in this table, and customer 102 is not granted access to Internet 106 via the hotspot 104. The Proxim AP 2500 access point may also be bundled with a Westell 2110 modem, thus connecting it to Internet connectivity infrastructure 202 through DSL, telephone, coaxial cable, or other hardware lines.

To provide for Wi-Fi access across a wide area, such as a city, hotspot venue(s) 104 may be placed at various locations throughout that area, such as, for example, at pay telephone booths. By placing hotspot venue(s) 104 at a pay phone booth, it will be more easily provisioned with hardwired communication lines to Internet connectivity infrastructure 202, such as by using the pre-existing DSL lines.

One of ordinary skill will recognize that many modifications may be made to system 200 within the spirit and scope of the present invention. For example, the location of hotspots is likely largely dependent on strategic concerns in order to least expensively cover a wide area; the connection between hotspot venue 104 and connectivity backbone 202 may be accomplished using DSL lines, or any now known or later developed communication means; and Hub 206, Access Controller 112, and/or Modem 208 may be implemented as part of the backend Internet connectivity infrastructure 202, rather than as a part of hotspot venue 104, so long as hotspot venue 104 and backend Internet connectivity infrastructure 202 together perform the necessary functions described herein.

As shown in FIG. 2, backend Internet connectivity infrastructure 202 may comprise a transport domain 210, which controls and routes traffic between each hotspot venue 104 and network service provider domain 204. In addition, a public fast packet domain 212 may carry the requests from transport domain 210 to either the Internet 106 via service provider domain 204, or to an authentication domain 214.

In one embodiment, transport domain 210 may comprise a Digital Subscriber Line Access Multiplexer 210a, an ATM switch 210b, and an Edge Router 210c. Edge Router 210c may be implemented either as a Gateway Router (GWR) or a Service Edge Router SER platforms. The Gateway Router platform may be based on Redback Networks' technology. The Service-Edge Router platform may be based on Juniper Networks' technology, and may be designed to provide service capabilities, such as user access management. One of ordinary skill will recognize that if an SER were deployed and used consistent with the present application, AC 112 would no longer be necessary, because the access management functions could be performed by the SER.

For traffic such as pending access requests by a customer 102, carried to authentication domain 214, the traffic may be carried from hotspot venue 104 to public fast packet domain 212 into internal network 216 to Wi-Fi administrative server 108, previously described with reference to FIG. 1.

Figure 3:
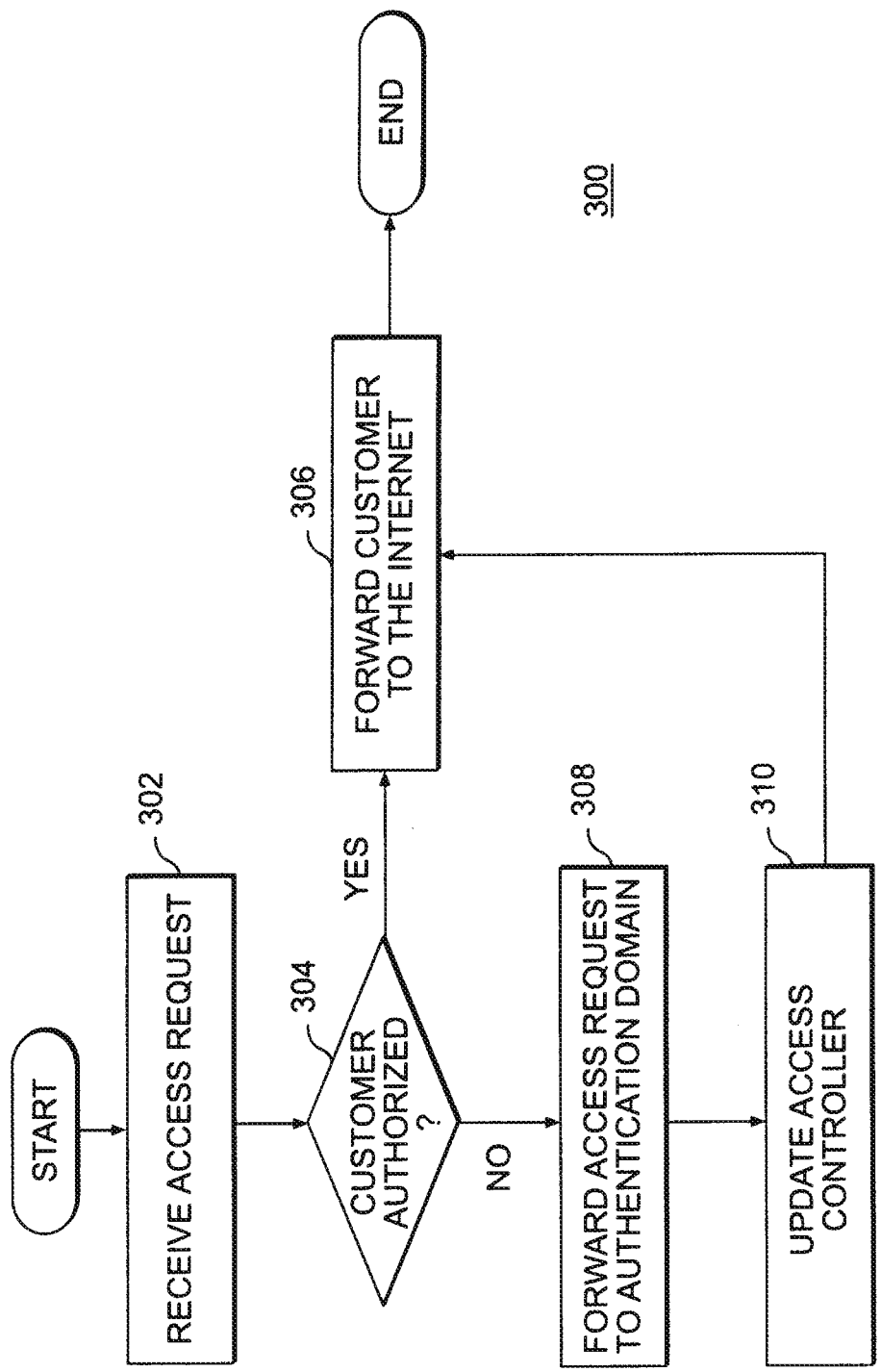
FIG. 3 is a flowchart depicting a method for accessing the Internet via a system, consistent with the present invention.

In general operation, systems 100 and 200 may operate using a method 300, as shown in FIG. 3. Referring to both FIGS. 2 and 3, method 300 begins when AP 110 receives connection request 109 from customer 102, stage 302. AP 110 forwards request 109 to access controller 112, possibly through Hub/switch 206 to determine if customer 102 is authorized to access the Internet through System 100 (or 200), stage 304. In one embodiment, AC 112 provides access control based on MAC addresses, with an option to allow requests from a MAC address to either pass through or be blocked. If AC 112 determines that connection request 109 has been authorized (stage 304, "Yes"), it forwards the valid request to Internet 106, stage 306, such as through cable modem 208, and backend Internet connectivity infrastructure 202. For example, transport domain 210 may multiplex the signal using digital subscriber line access multiplexer (DSLAM) 210a to separate the voice-frequency signals from the high-speed data traffic, and then route the traffic to the Internet 106 via ATM switch 210b, Edge Router 210c (GWR or SER), fast packet network 212, and service provider's domain 204.

If, however, connection request 109 is not an authorized request (stage 304, "No"), AC 112 instead forwards the request to Wi-Fi administrative server 114, stage 308, possibly via transport domain 210, fast packet network 212 and authentication domain 214. Only after Wi-Fi administrative server 114 authorizes customer 102 is AC 112 updated to reflect this authorization, stage 310. Customer 102 is then rerouted to the Internet 106 as described above, stage 306, as are all subsequent attempts by customer 102 until the customer is no longer authorized (for example, the customer has logged out, the user session has timed out due to inactivity, an administrator has killed the user sessions, the customer has insufficient funds to continue the session, or other similar reason).

1. Administrative Server 108

Figure 4:
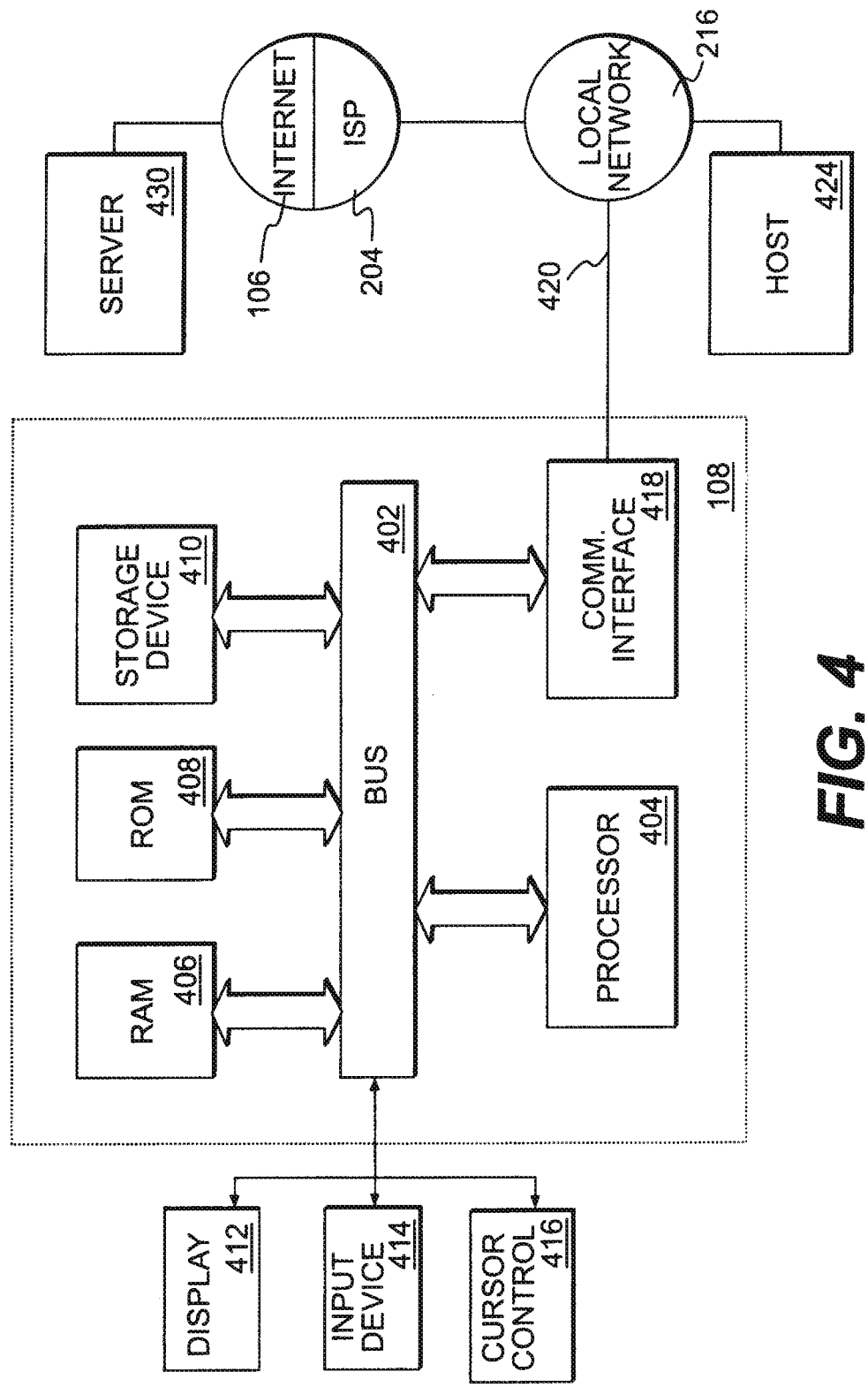
FIG. 4 is a block diagram illustrating an exemplary administrative computer for use in a system, consistent with the present invention.

FIG. 4 is a block diagram illustrating an exemplary administrative computer 108 for use in system 100 and/or 200, consistent with the present invention. Computer server 108 includes a bus 402 or other communication mechanism for communicating information, and a processor 404 coupled to bus 402 for processing information. Computer server 108 also includes a main memory, such as a random access memory (RAM) 406, coupled to bus 402 for storing information and instructions during execution by processor 404. RAM 406 also may be used for storing temporary variables or other intermediate information during execution of instructions to be executed by processor 404. Computer server 108 further includes a read only memory (ROM) 408 or other storage device coupled to bus 402 for storing static information and instructions for processor 404. A storage device 410, such as a magnetic disk or optical disk, is provided and coupled to bus 402 for storing information and instructions.

Computer server 108 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is a cursor control 416, such as a mouse, a trackball or cursor direction keys for communicating direction information and command selections to processor 404 and for controlling cursor movement on display 412. Cursor control 416 typically has two degrees of freedom in two axes, a first axis (e.g., x) and a second axis (e.g., y), which allow the device to specify positions in a plane.

According to one embodiment, computer server 108 executes instructions for provisioning and managing hardware and users of a wide area Wi-Fi system. Either alone or in combination with another computer system, computer server 108 thus permits the administration and provisioning of system 100 and/or 200 in response to processor 404 executing one or more sequences of instructions contained in RAM 406. Such instructions may be read into RAM 406 from another computer-readable medium, such as storage device 410. Execution of the sequences of instructions contained in RAM 406 causes processor 404 to perform the functions of administrative portal 114, and/or the process stages described herein. In an alternative implementation, hard-wired circuitry may be used in place of, or in combination with, software instructions to implement the invention. Thus, implementations consistent with the principles of the present invention are not limited to any specific combination of hardware circuitry and software.

The term "computer-readable medium" as used herein refers to any media that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media may also take the form of acoustic or light waves, such as those generated during radio-wave and infra-red data communications.

Common forms of computer-readable media include, for example, a floppy disk, flexible disk, hard disk, magnetic tape, or any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read. For the purposes of this discussion, carrier waves are the signals which carry the data to and from computer 108.

Various forms of computer-readable media may be involved in carrying one or more sequences of instructions to processor 404 for execution. For example, the instructions may initially be carried on the magnetic disk of a remote computer. The remote computer may load the instructions into a dynamic memory and send the instructions over a telephone line using a modem. A modem local to computer server 108 may receive the data on the telephone line and use an infra-red transmitter to convert the data to an infra-red signal. An infra-red detector coupled to bus 402 may receive the data carried in the infra-red signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer server 108 may also include a communication interface 418 coupled to bus 402. Communication interface 418 provides a two-way data communication coupling to a network link 420 that may be connected to network 216. Network 216 may be a local area network (LAN), wide area network (WAN), or any other network configuration. For example, communication interface 418 may be an integrated services digital network (ISDN) card or a modem to provide a data communication connection to a corresponding type of telephone line. Computer server 108 may communicate with a host 424 via network 216. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. In this embodiment, network 216 may communicate with an Internet Service Provider (ISP) 204. For example, network link 420 may provide a connection to data equipment operated by ISP 204. ISP 204, in turn, provides data communication services from another server 430 or host 424 to computer server 108. Network 216 may use electric, electromagnetic or optical signals that carry digital data streams.

Computer server 108 may send messages and receive data, including program code, through network 216, network link 420, and communication interface 418. In this embodiment, a server 430 may transmit an application program to computer 108 via network 216 and communication interface 418. In accordance with the present invention, one such downloaded application, portal 114 (FIG. 1), including, in one embodiment, methods 300, 600, 700, and 800 (to be described below), permits the provisioning and administration of Wi-Fi system 100 and/or 200. The received code may be executed by processor 404 as it is received and/or stored in storage device 410, or other non-volatile storage for later execution.

Although computer server 108 is shown in FIG. 4 as connectable to server 430, those skilled in the art will recognize that computer server 108 may establish connections to multiple servers on Internet 106 and/or network 216. Each such server includes an HTML-based Internet application, which may provide information to computer server 108 upon request in a manner consistent with the present invention.

2. Portal 114

Figure 5:
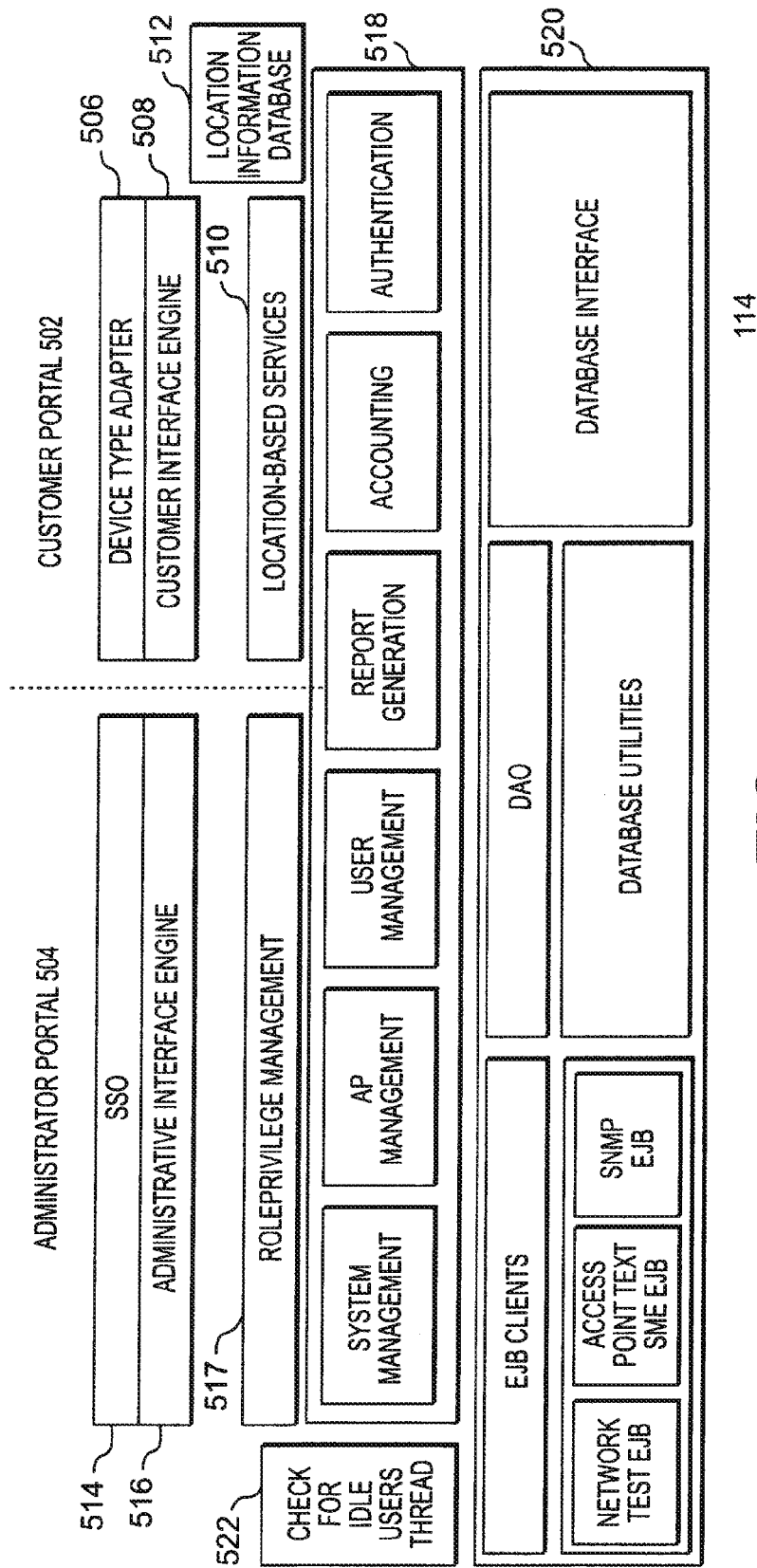
FIG. 5 shows an abstract view of an exemplary implementation of an administrative portal.

Consistent with the present invention, systems 100 and 200 employ portal 114 as an authentication application, which may be implemented and run as one or more software modules for user and administrator use on computer server 108. FIG. 5 shows a block diagram of an exemplary embodiment of portal 114 for administration and provisioning of systems 100 and/or 200, consistent with the present invention.

Portal 114 is functionally divided into two portals: a customer portal 502 for customer use and an administrative portal 504 for administrative users. In one embodiment, both portals may be built upon the same underlying infrastructure of middleware 518. Portal 114 generates and displays the web-based applications for the customer to log into and utilize Wi-Fi system 100 and/or 200 and for administrators to administer it.

Customer portal 502 implements a customer interface engine 508 which is preceded by a device type adapter component 506, which identifies the hotspot 104 to which customer 102 is attached. This may include identification of AP 110 such as its hardware type and networking information such as its IP address. Customer interface engine 508 and location-based services layer 510 may then use this identification information to generate the customer portal user interface (UI). For example, device type adapter component 506 may identify the location of customer 102, and the type of device used by customer 102 to access system 100 (or 200). Location-based services 510 may then access a location information database 512, such as Super Pages, to identify spots of interest nearby to customer 102. This information is passed back to customer interface engine 508 which generates the user interface, possibly in the form of a web page, and forwards that information to device type adapter 506 to format the information according to the needs of the customer's wireless device and/or AP 110 (for example, to insure compliance with the protocols installed on either the wireless device or AP 110).

Administrative portal 504 is safe-guarded by a login mechanism, such as Single-Sign On (SSO) platform 514, which provides an access control layer above the administrative interface engine 516. Interface engine 516 may itself be built upon a role-based privilege system 517 to provide a smaller resolution of access control than SSO platform 514 alone.

Both customer and administrative portals may utilize middleware component layer 518 to provide further system functions. For example, an authentication component may provide a unified interface to one or more authentication methods; an accounting and report generation component(s) may track user activity and user management; and AP management and system management components may be used to administer customers 102, AP 110, and system 100 (or 200) respectively.

Middleware component layer 518 may further utilize lower-level components 520 such as Enterprise Java Beans (EJB), and database and authentication interfaces. In addition, a CheckForIdleUsers thread 522 may be used to terminate users who are idle, possibly using the EJB client, database utilities, database interface, and DAO components.

3. Implementation of Portal 114

Portal 114 is, in one implementation, built as a web-based J2EE application, performing a number of parallel tasks and serving a number of different user groups. Portal 114 may be implemented using J2EE Servlets/JSP/Tag technologies to drive the web based display. In one embodiment, it is implemented using BEA Weblogic 6.1. In addition, it may be implemented on one or more administrative servers 108 such as Compaq DL380 CIB, running the Microsoft SQL Server 2000 sp3 as the database platform, and Windows 2000 Advanced Server. Furthermore, it may be implemented using dual Compaq DL 380s running Funk Steel-Belted RADIUS SPE and Weblogic 6.1, consistent with the present application.

4. Customer Portal 502

Figure 6A:
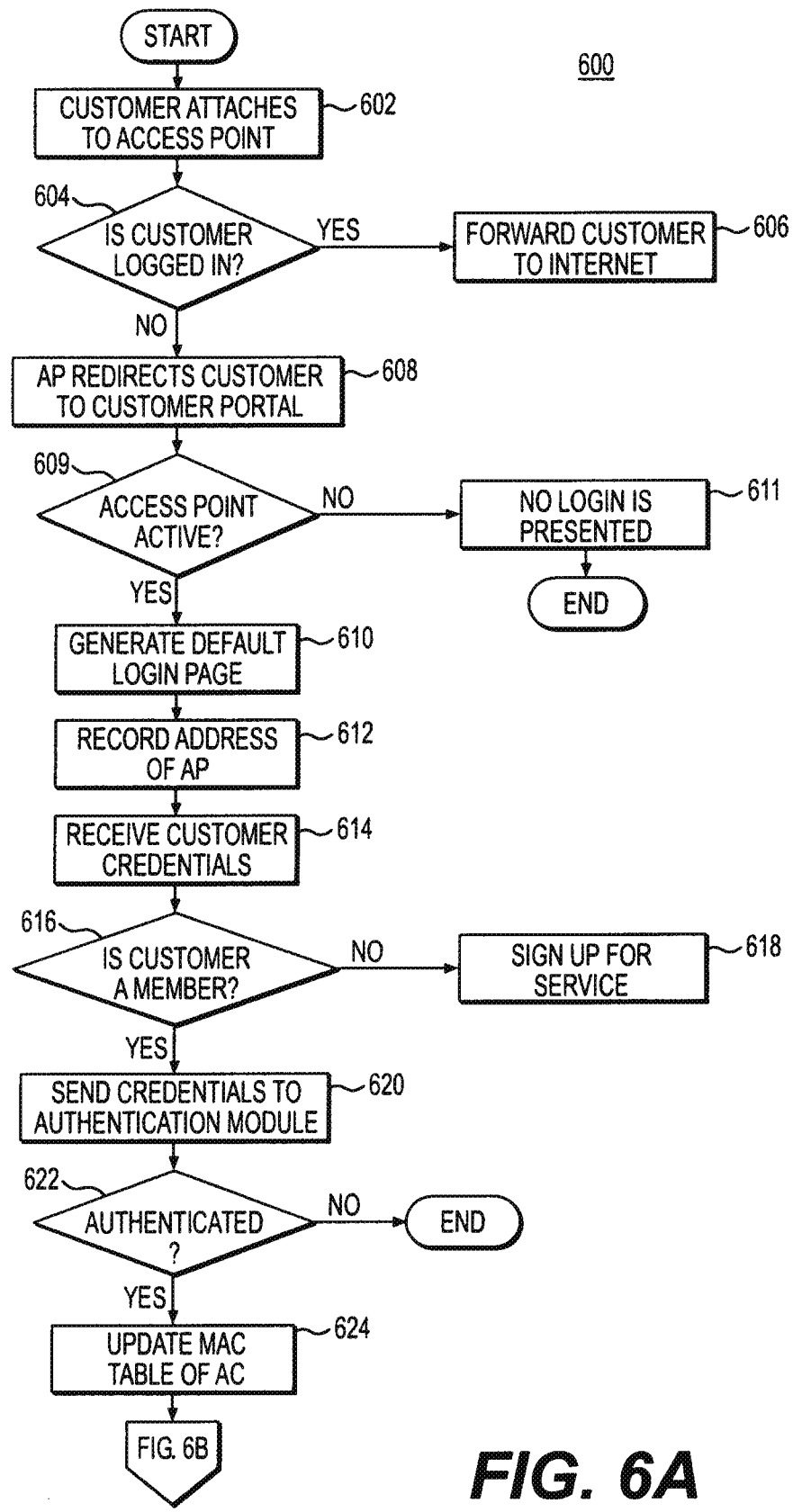
FIG. 6A shows a first part of an exemplary application sequence for authentication into a customer portal.
Figure 6B:
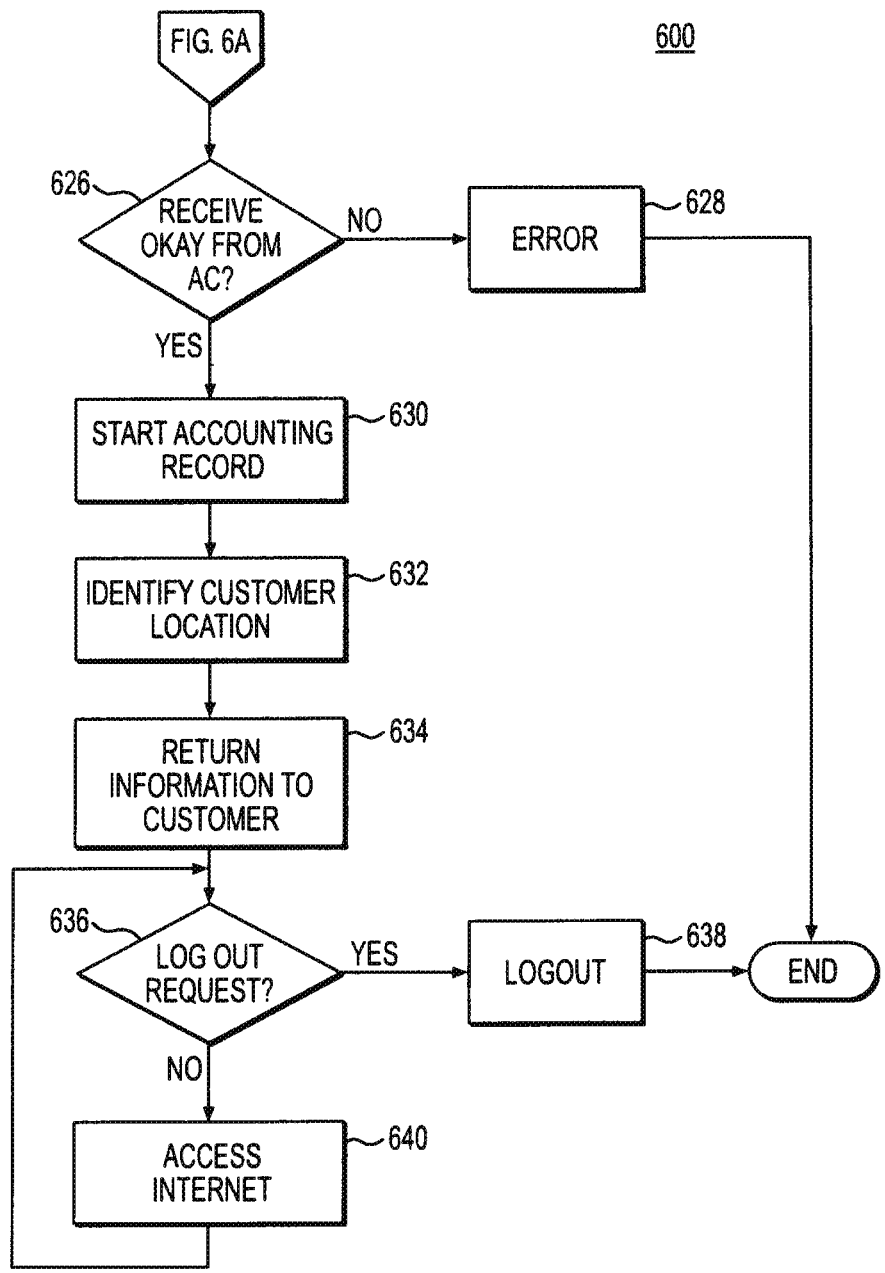
FIG. 6B shows a second part of an exemplary application sequence for authentication into a customer portal.

FIGS. 6A and 6B show an exemplary authentication method 600 for customer access to the Wi-Fi system through customer portal 502. Method 600 begins with detection of when customer 102 attaches to an access point of a hotspot 104 and opens a web browser on the customer's wireless-ready device, stage 602.

AP 110 first determines if the user is already authorized and logged into system 100 (or 200), stage 604, such as by checking the unique identifier of the user device against a table in AP 110 or AC 112 listing all users and/or user devices already logged into the system via that AP. If that user is already logged on (stage 604, "yes"), customer 102 is permitted access and redirected to Internet 106, stage 606.

If, however, customer 102 is not yet logged into hotspot 104 (stage 604, "No"), AP 110 and/or AC 112 redirects customer request 109 to customer portal 502, stage 608, passing along the unique ID of AP 110 where customer 102 is located and the customer's MAC Address. In one embodiment, this redirection takes place at the server level, for example, the AC or AP passes the customer request to a server (possibly a RADIUS or web services server) within transport domain 210, which then redirects the customer request to the authentication module for authentication of the user logon. In one embodiment, the unique ID of AP 110, passed with the customer request, may be the last six characters of the MAC Address of the embedded Network Identifier in the AP, or any other unique identifier. This communication may take place using any communication protocol, however, in one embodiment, a secure protocol such as 128-bit HTTPS (1024-bit key) is used.

Method 600 then determines whether the AP 110 and/or AC 112 are active, stage 609. For example, each component of systems 100 and 200 may be associated, for example, in system database 118 with a status, for different points in their lifecycle. For example, each component may be "Active," "Inactive" (such as to initiate a troubleshooting process, described further below), "New" (such as during the installation process, and before all testing of the item is complete), or any other status that may be of use to system administrators. Once customer request has been received at the authentication module (or possibly at a server in the transport domain), a check is made against the system database 118 to determine the status of the AC and/or AP from which the request was received. If the AC and AP are both active (i.e., they are operating properly), method 600 will continue to stage 610 to generate a login page for the customer requesting access. If the AC, AP, or other necessary hardware component is listed as having a status of anything other than "Active," the user is informed that the Internet Access is currently unavailable, the user is not presented with a login page, and the method ends.

Returning to stage 610, provided that the necessary hardware components are active, AP device type adapter 506 and customer user interface 508 generate a default login page, stage 610, to allow customer 102 to access online help or enter their credentials (i.e., a user name and password) to login. Simultaneously, customer portal 502 records the information provided by AP 110 and stores this information as upending access request in a new record in accounting database 116, stage 612. Once the credentials are received by administrative server 108 and portal 114, stage 614, they are temporarily stored and a check is made to see if customer 102 is a member of the Wi-Fi service, stage 616.

If customer 102, as identified by the entered credentials, is not a member (stage 616, "No") customer 102 is requested to sign up for the service, such as by accepting the terms of service before authentication will continue, stage 618, before proceeding to either stage 622 or 626. If customer 102 is a member of the service (stage 616, "Yes"), the credentials are then forwarded to the authentication module, stage 620.

Once received at the authentication module, method 600 then attempts to authenticate the customer, using his credentials, to determine if the user can be granted access to Internet 106 via system 100 (or 200), stage 622. In order to check if customer 102 is authorized, administrative server 108 queries authentication database 120 to see if customer 102 (the user name/password pair) is authorized. In one embodiment, customer portal 502 does not itself maintain customer credentials. Instead, authentication requests may be forwarded to one or more appropriate authentication systems for different customer segments. As such, server 108 has no a priori knowledge of what authentication system to use for a given customer and must try all systems until a match is found. In this embodiment, method 600 may access system database 118 to obtain an identification of each such authentication data storage. Then, using the protocols and addresses for those storages, which may also be stored in system database 118, method 600 then queries each listed authentication data store using the identified parameters.

If credentials of customer 102 are not authenticated (stage 622, "No"), then an error is returned to customer 102, the customer is not granted access to Internet 106 via system 100 (or 200), and method 600 ends. If any one of the authentication databases returns a positive authentication (stage 622, "Yes"), the user is authenticated, and the method continues to stage 624. One of ordinary skill in the art will recognize that, consistent with the present invention, checking to see if customer 102 is a member of the service (stage 616) and authenticating customer (stage 622) may be combined into a single query of each applicable database.

Upon a successful authentication, portal 114 sends a request to AC 112 to add customer 102 to the authorized MAC Address table, stage 624. In one embodiment, portal 114 may access system database 118 to identify the address, port number, and protocol to use to send such a request.

Referring to FIG. 6B, the system then awaits a successful response from AC 112 to determine if the user was properly added to the MAC table on that AC, stage 626. This response may, in one embodiment be either an "okay" or a error message, denoting that the update was not successful. If a successful response is not received from the AC 110 (stage 626, "No"), then the system generates an error message for the user and a system administrator, stage 628. If, however, a successful response is returned from AC 112 (stage 626, "Yes"), a "start" accounting record is created in accounting database 116 for customer 102 with their MAC Address, provided user name, AP unique ID and the start time of the session, stage 630. This record may be used by the accounting system, for among other things, to track the customer's usage of system 100 (or 200).

Portal 114 then identifies the location of the user, stage 632. In one embodiment, customer portal 502 utilizes the location and identification information of the AP 110 (possibly retrieved from system database 118) to locate customer 102 according to the hotspot venue 104 to which the customer is attached. While this method for locating the customer may not be as accurate as for example, GPS, it can locate customer 102 within a few blocks within a city. Customer portal 502 may then utilize the location based services 512 to provide a map of the location nearby the customer, the location of other nearby hotspot venues (for the user to be able to identify areas that may have better connection signals or speeds, or with a better ambiance), or to provide a list of nearby sites of interest, such as restaurants, accommodations (i.e., hotels), museums or other site.

Method 600 then sends the location-based information, together with an encrypted version of the customer's user name, MAC Address and unique ID of AP 110 (utilizing any now known or later developed encryption algorithm such as 3DES), as part of a web page in a pop-up window to customer 102, stage 634. The encrypted information may be utilized to generate a button on the display, the selection of which (stage 636, "Yes"), may un-encrypt the encrypted information and create a request (using, for example, XML) to AP 110 to remove customer 102 from the authorized MAC Address table, stage 638. However, until the customer attempts to logout (stage 636, "No"), the user is granted access to Internet 106 via system 100 (or 200), stage 640.

5. Idle User Thread 522

Figure 8:
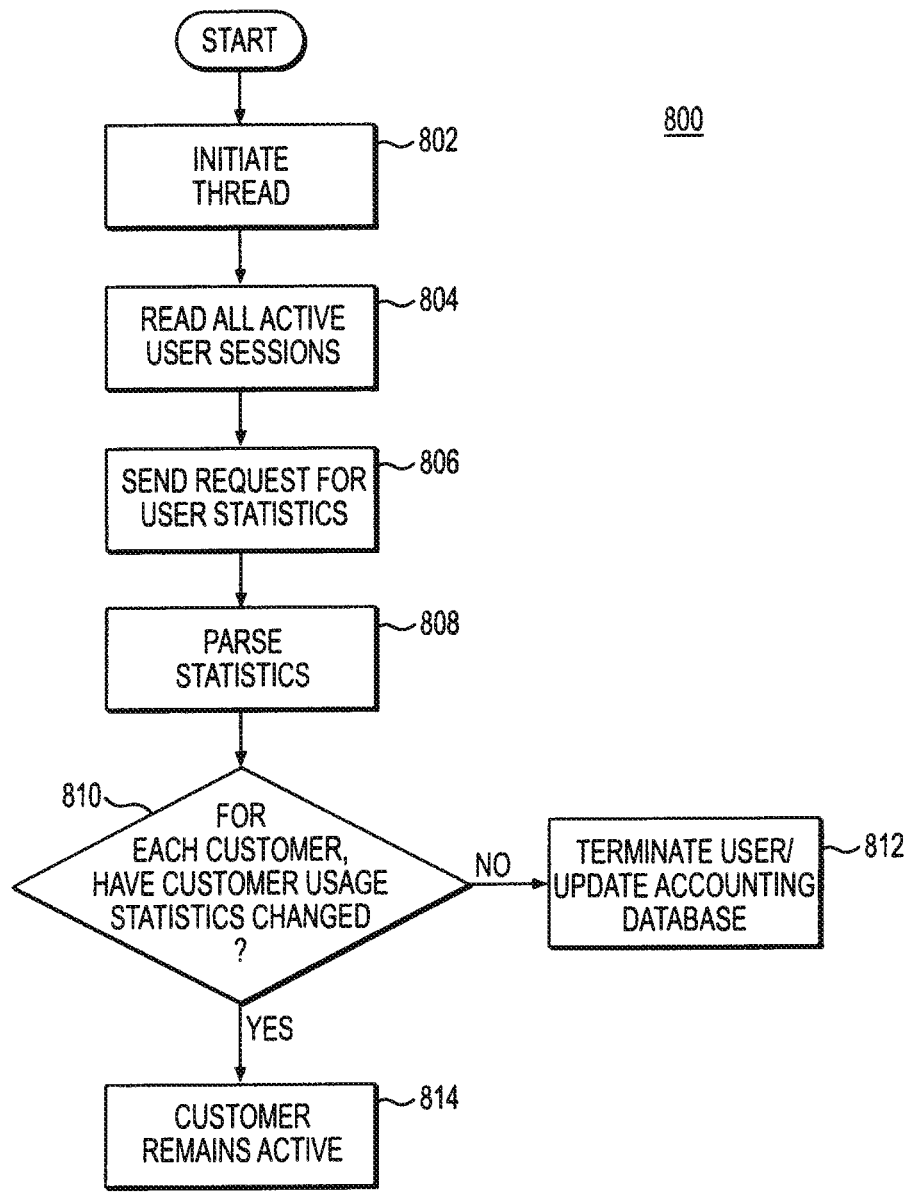
FIG. 8 is a flowchart showing an exemplary method for managing idle user threads.

FIG. 8 shows a flowchart of exemplary method 800 for locating and terminating idle user sessions. Method 800, which may be implemented as part of idle user check 522 executing on server 108, begins at stage 802 by initiating an idle client thread at regular intervals, such as every 7.5 minutes. This thread reads all active sessions from accounting database 116, stage 804, including the last known number of bytes transferred for the user session. For each AP 110 that has active users, a request is sent to that AP to retrieve the current session statistics, stage 806. In one embodiment, idle user thread will query, for each AP, the system database to determine the appropriate protocol to use to communicate with that AP. If the AP requires SNMP, an SNMP Agent (i.e., device type adapter 506) sends SNMP v2 GET requests to the AP and retrieves the list of active users.

For each user, method 800 then parses the information about current users and the number of bytes transferred during the session, stage 808, to determine whether the user is still active. In general, this information may show one of several states. First, if the user is not active on AP 110, (stage 810, "No"), but is active in accounting database 116, then the "bytes transferred" value is updated in the database, the user status is set to inactive, and the user session is terminated, stage 812. Second, the user may be active on AP 110 and in accounting database 116 (stage 810, "Yes"), in which case no update is necessary, and the user remains active, stage 814. Third, if the number of bytes transferred is different in accounting database 116 than when the last idle user check took place, the user is assumed to be active (stage 810, "Yes"). Thus, the "bytes transferred" value is updated in accounting database 116 and the user remains active, stage 814. Finally, if the number of bytes transferred is the same as when the last check was made, the user is assumed to be idle (stage 810, "No"). In this case, the user is terminated, stage 812.

Furthermore, the idle thread process also tracks the total online time for each user, in an effort to limit each session to a particular limit, usually 7.5 hours. To do this, the idle user thread 522 also checks accounting database 116 to determine if the user time exceeds the limit. If so, a request is sent to the appropriate AC 104 to kill the user session. Accounting database 116 is then updated to reflect that the user is no longer active.

6. Administrative Portal 504

Figure 7:
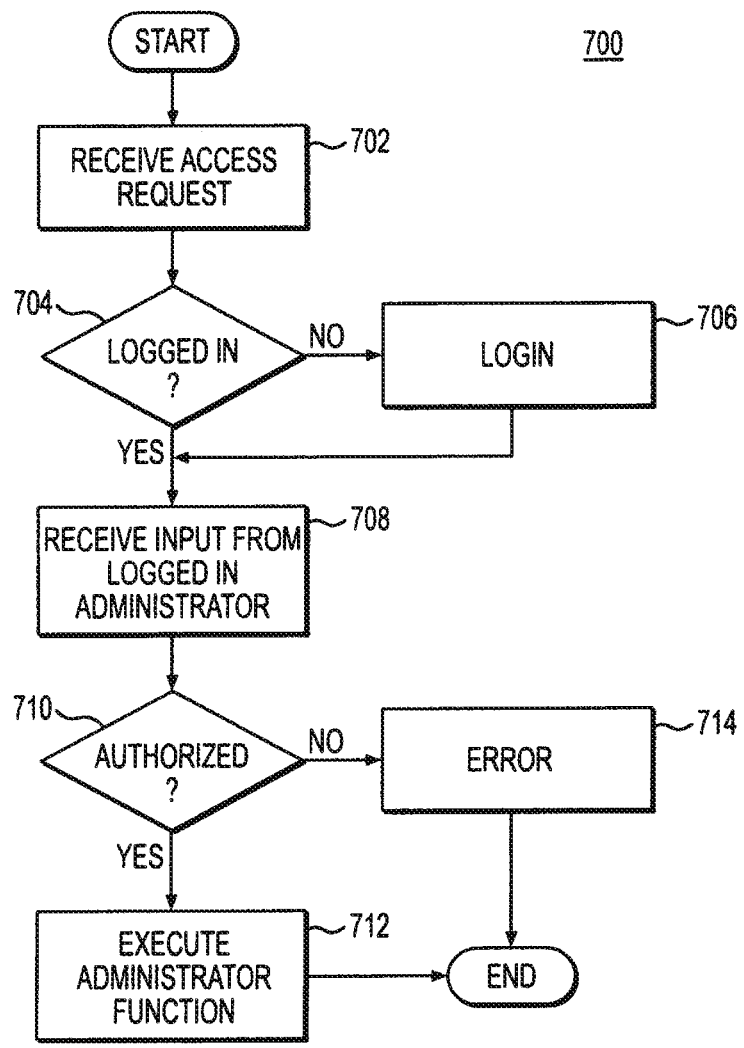
FIG. 7 shows an exemplary application sequence for the functionality of an administrative portal.

FIG. 7 shows an exemplary method 700, consistent with the present invention, for utilizing administrative portal 504. Prior to beginning execution of method 700, a master administrative user account is created, usually upon installation of portal 114. This user account is used to create all subsequent portal user accounts through the portal application. When each subsequent a user is created, it is added to the SSO channel and assigned a role in the administrative database.

Method 700 begins with reception of an administrative user attempt to access administrative portal 504, such as via an http address, stage 702. If the administrative user has not previously logged in, (stage 704, "No"), SSO 514 redirects the user to the SSO login page by SSO 514, stage 706. Upon successful login (stage 704, "Yes"), the administrative portal 504 retrieves the user name from the browser cookie and retrieves the corresponding user role from the administrative database. As the user initiates functions (requests or commands) during a session, stage 708, they are checked against the permissions associated with the role in the database, stage 710. If authorized, (stage 710, "Yes") portal 114 executes the function, stage 712. If not, portal 114 generates an error message, stage 714 and method 700 ends.

Administrators, using administrative portal 504 are able to administer data stored in the databases, such as accounting records and hotspot configurations. Among the commands available to the administrators are:

Data retrieval requests. The administrator may request retrieval of data, such as a list of pending users (i.e., someone who has requested access through AP 110 but has not been authenticated yet) from accounting database 118 or a current configuration of a specific AP or AC from system database 120. In one embodiment, a request for a pending user may be used if a user is having difficulty logging on to the system. For example, customer 102 may call (such as through a 1-800 number) an authorized user (i.e., a user granted the rights to execute a certain command), at which point the administrator may query the accounting database for pending users and/or authenticated users on the AP through which the customer is attempting to authenticate. The administrator may then delete the pending user record to "reset" the system and allow customer 102 to try the authentication a second time.

Access point (or Access controller) commands. The administrator may send commands to AP 110 or AC 112 to administer the AP or AC. For example, an administrator may terminate or "kill" a user session. To accomplish this, the administrator may execute the command at which point the system will identify AP 110 to which customer 102 is attached. Using the protocol and address identified in system database 120 corresponding to AP 120, portal 114 then sends a request to the AP (or AC) to remove the user from its authenticated user list. Customer 102 will no longer be allowed access to the Internet until he/she logs on again. In addition, the system may also update or delete any accounting records corresponding to customer 102's session that has been killed to reflect the final statistics for the session and to identify that the session is no longer active.

Hardware provisioning. An administrator, using administrator portal 504 may install or troubleshoot hardware in the system. For example, to install new hardware, such as a new access point, access controller, or authentication database, the administrator portal may execute method 900, FIG. 9.

Figure 9:
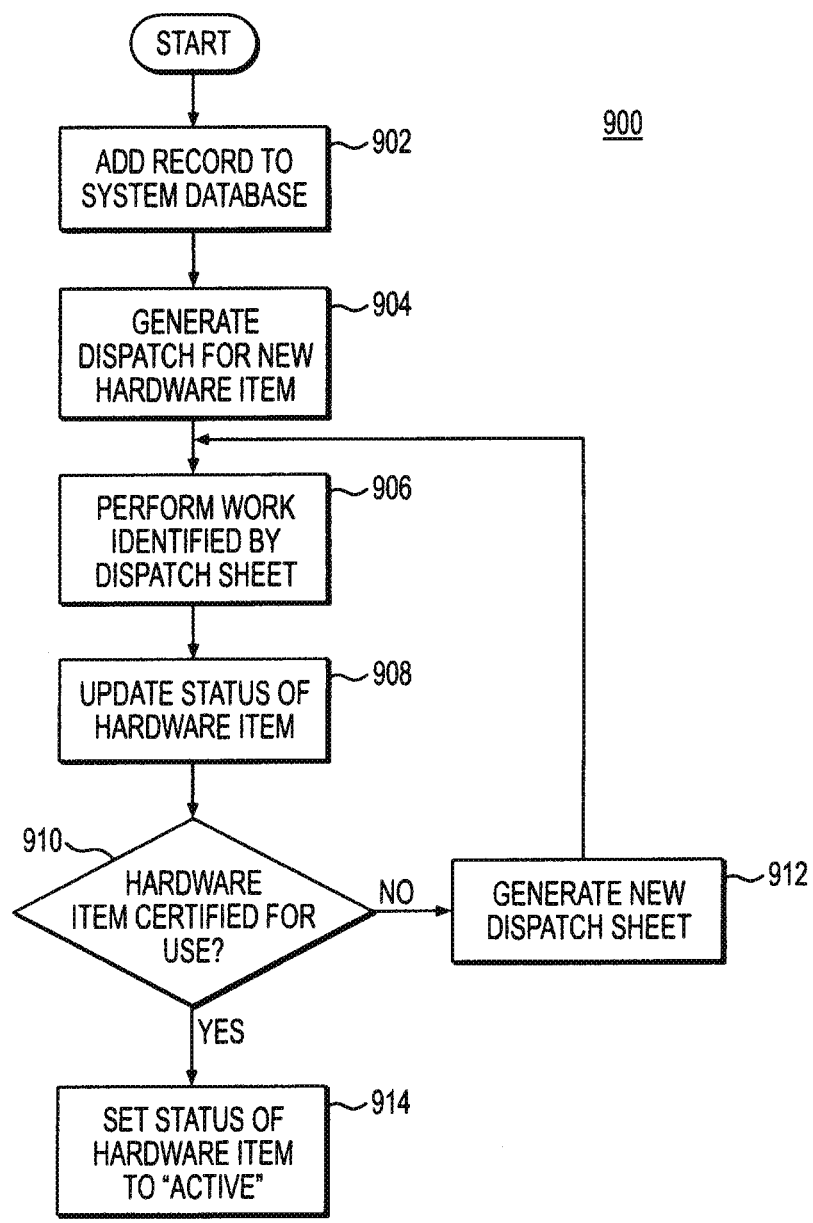
FIG. 9 is a flowchart showing an exemplary method for installing and provisioning new hardware.

Referring to FIG. 9, method 900 begins at stage 902, with administrator portal adding a new record for the new hardware to system database 118. This record may identify the address of the hardware (i.e., an access point or access controller), as well as any necessary addresses (IP addresses or Port numbers) and any necessary protocols (i.e., XML, SNMP). In addition, the record may contain a status for the new hardware component identifying it as "New." The "New" status indicates to the system that the hardware component has not been tested, and thus will not allow users to access the Internet via the new hardware component (See FIG. 6A, stage 609). The "New" status for the hardware component will trigger generation of a "dispatch sheet", indicating that the hardware component must be tested, stage 904. A dispatch sheet is a request to a system administrator or other personnel to perform a task. In the case of a dispatch sheet for hardware component with a status of "New," the dispatch sheet will indicate to the administrator or other personnel to test the hardware component, stage 906. FIG. 10 shows an exemplary screenshot 1000 of a user interface generated by the administrator portal identifying exemplary hardware items and their current status.

Referring again to FIG. 9, once the "New" item has been tested as requested by the dispatch sheet, the status of the new hardware item may be changed in system database 118. For example, if the tester found a problem, such as, in the case of a new access point, the access point cannot be "pinged" (does not respond to the network "Ping" command), the status may be changed to "Inactive" or "Under repair." Upon updating the status to this new status, the system may (automatically or upon request of the system administrator) send a dispatch sheet for troubleshooting the found problems, or to perform any work on the hardware component that remains to be finished, stage 912, and the method returns to stage 906 for a system administrator to perform the work identified on the dispatch sheet. If however, the test results for the new hardware item show that the item is ready for use, that is, it is certified by the administrator, stage 910, then the hardware status is set to active, stage 914, and the method ends.

Once the hardware is in place, and its status has been set to "Active," the system is set to perform with the new hardware. Any request from the AC or AP will be recognized by system database, because it has a corresponding record in the system database identifying its address and required protocols. In addition, any attempt by the system to send a command to the hardware will simply require the system to look up, in the system database 118, the address and port number, and to forward the communication to the hardware through the appropriate agent (for example, device type adapter 506). By way of example, if the hardware requires XML as the protocol, device type adapter 506 translates the command into XML and sends the command to the new hardware.

One of ordinary skill in the art will recognize that method 900 may be utilized to administer or troubleshoot hardware as well. For example, upon receipt of an indication that a piece of hardware within the system is not functioning properly, the record for that item in system database 118 may be set to "Inactive," triggering a dispatch sheet identifying any work to be performed on the hardware component (stage 904, FIG. 9). Because the status of the item is no longer set to active, the hardware component will not be usable by the system to access the Internet (See FIG. 6A, stage 609). Accordingly, the remaining stages of FIG. 9 may then be performed to troubleshoot and reactivate the hardware item upon completion of the troubleshooting.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    receiving an access request through an access point of a Wi-Fi system, the Wi-Fi system configured to provide connection to an Internet, the access request being generated by a wireless device of a user and sent wirelessly to the access point;
    identifying a unique identifier of the wireless device from the access request;
    comparing the unique identifier of the wireless device to a number of unique identifiers stored at the access point;
    if the unique identifier of the wireless device does not match any of the number of unique identifiers:
        transmitting a signal from the access device to a portal system via an internal network,
        determining at the portal system a type of the wireless device,
            transmitting to the wireless device a first user interface containing a login page for receiving at least one user credential, the first user interface formatted according to the type of the wireless device,
        receiving from the wireless device the at least one user credential,
            determining whether the at least one user credential is authorized based on whether the at least one user credential is stored in a database of credentials of authorized users, and
        if the at least one user credential is authorized,
            storing the unique identifier of the wireless device at the access point,
            receiving an acknowledgment signal at the portal system from the access point that the unique identifier of the wireless device has been stored at the access point,
            and
            upon receipt of the acknowledgement signal:
                permitting access by the wireless device to the Internet, and
                tracking usage of the Wi-Fi system by the wireless device, the tracking including storing a start time of the usage and a unique identifier of the access point;
    determining a location for the wireless device, based on information identifying a location of the access point; and
    transmitting a signal to the wireless device, the signal containing a second user interface formatted according to the type of the wireless device and causing the wireless device to display location-specific information based on the determined location of the wireless device.

2. The method of claim 1, wherein the unique identifier of the wireless device is a MAC address of the wireless device.

3. The method of claim 1, wherein the at least one user credential is a username and a password.

4. A system comprising:
    an access point of a Wi-Fi system configured to provide connection to an Internet, the access point storing a number of unique identifiers and configured to receive an access request from a user wireless device;
    a portal system implemented on at least one computer, the portal system communicatively connected to the access point, the portal system including:
        a device type adapter that determines a type of the user wireless device and a location of the user wireless device,
        a customer interface engine that generates a first user interface having a login page to receive at least one user credential and a second user interface having location specific information, and
        a location information system that provides the location specific information based on the location of the user wireless device;
    wherein the access point, upon receipt from the user wireless device of an Internet access request containing a unique identifier of the user wireless device, determines whether there is a match of the unique identifier of the user wireless device to any of the number of unique identifiers stored by the access point, and transmits a signal to the portal system via an internal network when no match is determined;
    wherein the portal system, upon receipt of the signal from the access point indicating that no match has been determined, determines the type of the user wireless device, formats the first user interface according to the type of the user wireless device, and transmits the formatted first user interface to the user wireless device;
    wherein the portal system, upon receipt of the at least one user credential, determines whether the at least one user credential is authorized based on whether the at least one user credential is stored in a database of credentials of authorized users, and if the at least one user credential is authorized, transmits a first request to cause the access point to add the unique identifier to the number of unique identifiers stored by the access point;
    wherein the access point, upon receipt of the first request to add the unique identifier to the number of unique identifiers stored by the access point, stores the unique identifier at the access point and transmits an acknowledgement to the portal system that the unique identifier has been stored;

wherein the portal system, upon receipt of the acknowledgement:
permits access by the user wireless device to the Internet,
causes a tracking of usage of the Wi-Fi system by the user wireless device, the tracking including storing a start time of the usage and a unique identifier of the access point,
determines the location of the user wireless device, generates the second user interface based on the location of the user wireless device, formats the second user interface according to the type of the user wireless device and transmits the formatted second user interface to the user wireless device.

5. The system of claim 4, wherein the unique identifier of the user wireless device is a MAC address of the user wireless device.

6. The system of claim 4, wherein the at least one user credential is a username and a password.

7. The system of claim 4, further comprising:
an accounting system storing records tracking usage time of the Wi-Fi system;
wherein upon receipt of the acknowledgment, usage of the Wi-Fi system by the user wireless device is tracked in the accounting system, including storage of the usage start time and the unique identifier of the access point.

8. The method of claim 1, wherein the unique identifiers stored at the access point are associated with wireless devices that are permitted to access the Internet via the access point.

9. The method of claim 1, further comprising:
receiving a logout request from the wireless device; and
responsive to receiving the logout request, removing the stored unique identifier.

10. The method of claim 1, further comprising:
monitoring an Internet usage statistics associated with the wireless device; and
determining to remove the stored unique identifier based on a result of the monitoring.

11. The method of claim 1, further comprising:
determining a status associated with the access point;
wherein the first user interface is not transmitted if the status associated with the access point is determined to satisfy a pre-determined condition.

12. The method of claim 1, wherein determining whether the at least one user credential is authorized comprises:
identifying parameters of the database of credentials of authorized users; and
querying the database of credentials of authorized users using the identified parameters.

13. The method of claim 1, wherein the internal network is at least one of: a local area network, and a wide area network.

14. The system of claim 4, wherein the unique identifiers stored at the access point are associated with wireless devices that are permitted to access the Internet via the access point.

15. The system of claim 4, wherein the portal system, upon receipt of a logout request from the wireless device, transmits a second request to the access point to cause the access point to remove the stored unique identifier of the wireless device.

16. The system of claim 4, wherein the portal system monitors an Internet usage statistics associated with the wireless device and determines to remove the stored unique identifier of the wireless device based on a result of the monitoring.

17. The system of claim 4, wherein the portal system:
determines a status associated with the access point;
wherein the formatted first user interface is not transmitted if the status associated with the access point is determined to satisfy a pre-determined condition.

18. The system of claim 4, wherein the determination of whether the at least one user credential is authorized comprises the portal system:
identifying parameters of the database of credentials of authorized users; and
querying the database of credentials of authorized users using the identified parameters.

19. The system of claim 4, wherein the internal network is at least one of: a local area network, and a wide area network.

* * * * *